United States Patent [19]

Ishikawa et al.

[11] Patent Number: 5,289,206
[45] Date of Patent: Feb. 22, 1994

[54] RECORDING PAPER FEEDING PORTION IN AN XY PLOTTER

[75] Inventors: Tadao Ishikawa; Nazuhiko Sanda; Ryoji Hirakata, all of Tokyo; Kiyokatsu Sugiyama, Kanagawa, all of Japan

[73] Assignee: Iwatsu Electric Co., Ltd., Tokyo, Japan

[21] Appl. No.: 773,428

[22] Filed: Oct. 9, 1991

[30] Foreign Application Priority Data

Oct. 9, 1990 [JP] Japan .................................. 2-270943

[51] Int. Cl.$^5$ ...................... G01D 15/24; B65H 5/06; B41J 15/04
[52] U.S. Cl. .................................. 346/134; 271/272; 271/274; 346/136; 400/636
[58] Field of Search .................. 346/134, 139 R, 129, 346/136; 400/551, 577, 578, 636, 637, 641; 33/1 M, 18.1, 18.2, 32.3–32.7; 271/272–274; 226/189, 193; B65H 5/06; B41J 15/04; G01D 15/24

[56] References Cited

U.S. PATENT DOCUMENTS 4,903,045  2/1990  Sakamoto et al. .................. 346/136
5,163,675 11/1992  Sundhara ............................ 271/274

*Primary Examiner*—Benjamin R. Fuller
*Assistant Examiner*—Alrick Bobb
*Attorney, Agent, or Firm*—Oblon, Spivak, McClelland, Maier & Neustadt

[57] ABSTRACT

An XY plotter includes a pair of grip and pinch rollers for feeding recording paper in one direction while gripping the recording paper therebetween, a pen carriage arranged to be movable in the direction perpendicular to the one direction, a pen supported by the pen carriage for performing recording on the recording paper, a grip roller shaft provided parallel to the traveling direction of the pen carriage, the grip roller shaft having a non-circular section, a movable stand arranged so that the position thereof is adjustable in the longitudinal direction of the grip roller shaft, and the grip and pinch roller including a movable partial grip roller and a pinch roller, the movable partial grip roller being mounted on the movable stand so that the movable partial grip roller is not rotatable relative to the grip roller shaft but is movable on the grip roller shaft in the longitudinal direction thereof, the pinch roller being supported on the movable stand so that the pinch roller is made to come into contact against a circumferential surface of the movable partial grip roller.

2 Claims, 6 Drawing Sheets

RECORDING PAPER FEEDING PORTION IN AN XY PLOTTER

BACKGROUND OF THE INVENTION

1. Field of the Invention

The present invention relates to an XY plotter for use for recording images and characters, and particularly relates to the structure of a recording paper feeding portion in the XY plotter.

2. Description of the Prior Art

As well known, in an XY plotter for use, for example, for recording character information or graphic information in a computer or the like, recording paper is fed in one direction by grip rollers and pinch rollers for grasping the recording paper, and recording is performed on the recording paper by use of a recording pen supported by a pen carriage movable in the direction perpendicular to the feeding direction of the recording paper.

In such a conventional recording paper feeding portion of the XY plotter, however, variously sized sheets of recording paper are used. Therefore, an elongated rod-like grip roller to be driven by a driving source such as a pulse motor or the like is provided in the direction perpendicular to the feeding direction of the recording paper, and a pinch roller which is detachable from the circumferential surface of the grip roller is positionally adjustably attached to a fixing portion of the the apparatus. In another case, a grip roller shaft is provided in place of the elongated grip roller, and partial grip rollers are mounted on the grip roller shaft at a plurality of portions thereof in its longitudinal direction. The position of the pinch roller is changed in accordance with the size of recording paper to be used so that one portion of the recording paper is grasped by the partial grip rollers and the pinch roller so as to accurately feed the recording paper. In the former structure, however, there is a problem in the situation where an elongated grip roller having a considerably large mass is used so that the inertia mass of the grip roller is so large that the recently increased demand for rapid feeding of the recording sheet cannot be sufficiently realized. In the latter structure, although the whole inertia efficiency becomes smaller than that of the former structure, there is a problem in that if the number of kinds of the size of recording paper to be used becomes large, it is necessary to mount a number of partial grip rollers onto the grip roller shaft, so that the inertia efficiency of the movable portions cannot be reduced as desired, and it is impossible to handle recording paper having modified sizes.

SUMMARY OF THE INVENTION

In view of the problems of the recording paper feeding configurations of the conventional XY plotter as described above, it is an object of the present invention to provide an XY plotter in which movable portions have small inertia efficiency, and in which the size of recording paper to be used has no limit.

In order to attain the above object, according to an aspect of the the present invention, the XY plotter comprises: grip and pinch rollers for feeding recording paper in one direction while gripping the recording paper therebetween; a pen carriage arranged to be movable in the direction perpendicular to the one direction; a pen carried by the pen carriage for performing recording on the recording paper; a grip roller shaft provided parallel to the traveling direction of the pen carriage, the grip roller shaft having a non-circular section; a movable stand arranged so that the position thereof is adjustable in the longitudinal direction of the grip roller shaft; and the grip and pinch rollers including a movable partial grip roller and a pinch roller, the movable partial grip roller being mounted on the movable stand so that the movable partial grip roller is not rotatable relative to the grip roller shaft but is movable on the grip roller shaft in the longitudinal direction thereof, the pinch roller being supported on the movable stand so that the pinch roller is made to be come into contact against a circumferential surface of the movable partial grip roller. Various other objects, features and attendant advantages of the present invention will be more fully appreciated as the same becomes better understood from the following detailed description when considered in connection with the accompanying drawings in which like reference characters designate like or corresponding parts throughout the several views and wherein:

DESCRIPTION OF PREFERRED EMBODIMENTS

Figure 1:
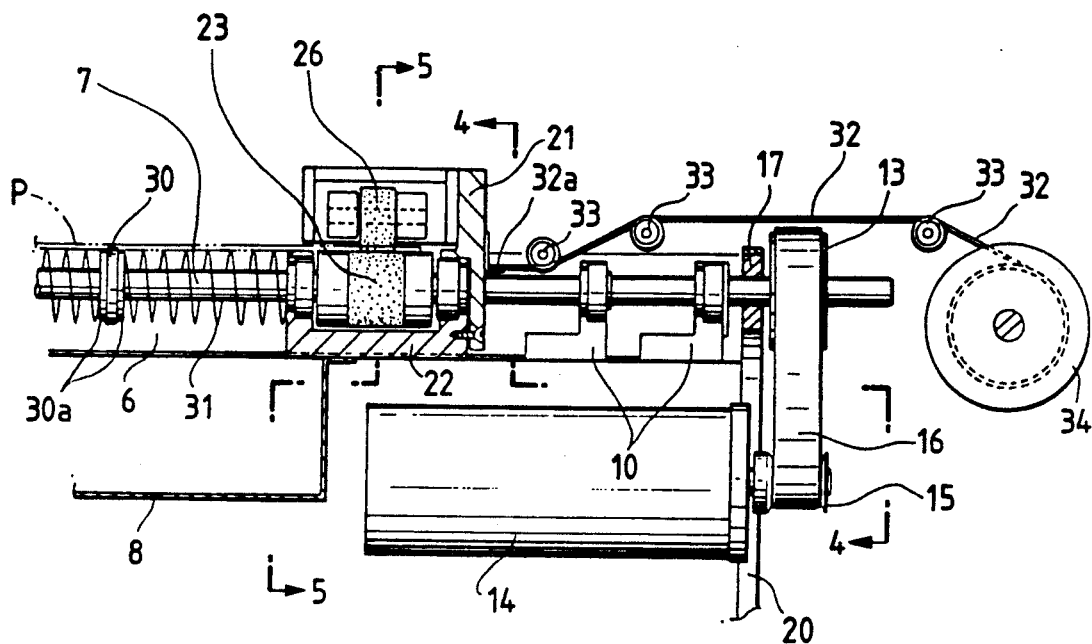
FIG. 1 is an enlarged sectional view of the right portion of a recording paper feeding portion of the XY plotter according to the present invention.

Referring to the drawings, an embodiment of the XY plotter according to the present invention will be described in detail hereunder.

Figure 2:
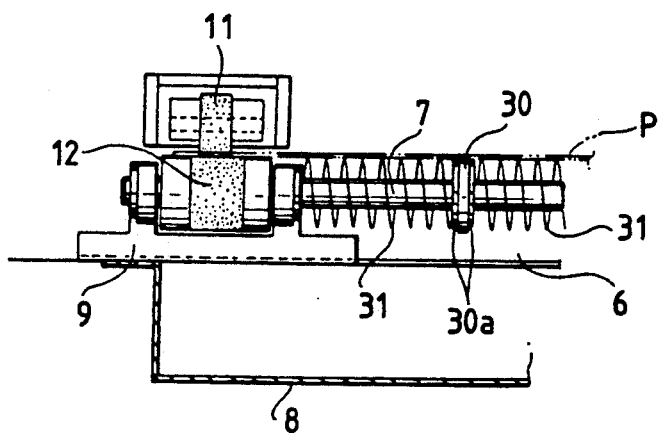
FIG. 2 is an enlarged sectional view of the left portion of the recording paper feeding portion of the XY plotter.
Figure 3:
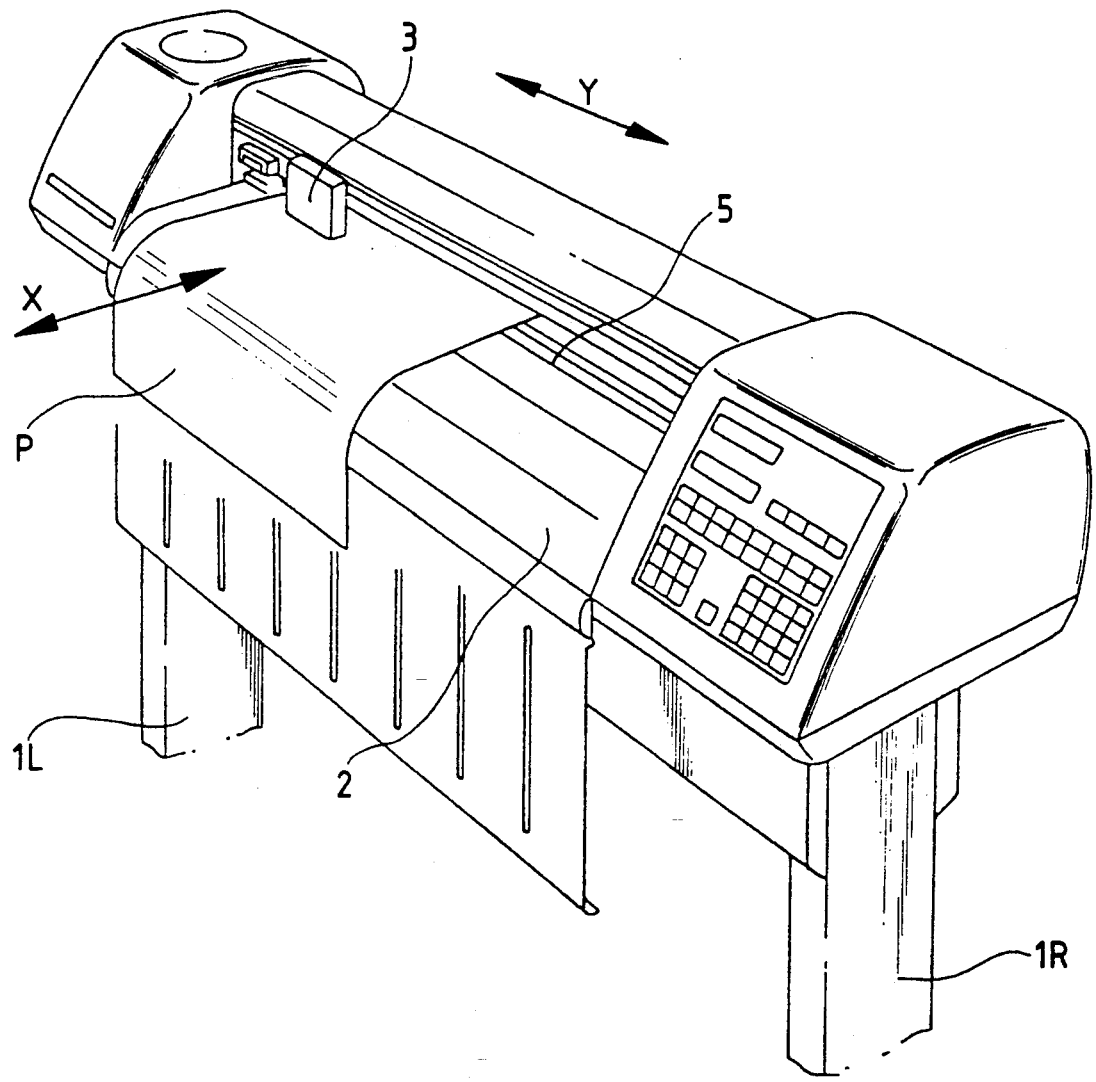
FIG. 3 is a perspective view of the entire XY plotter.
Figure 4:
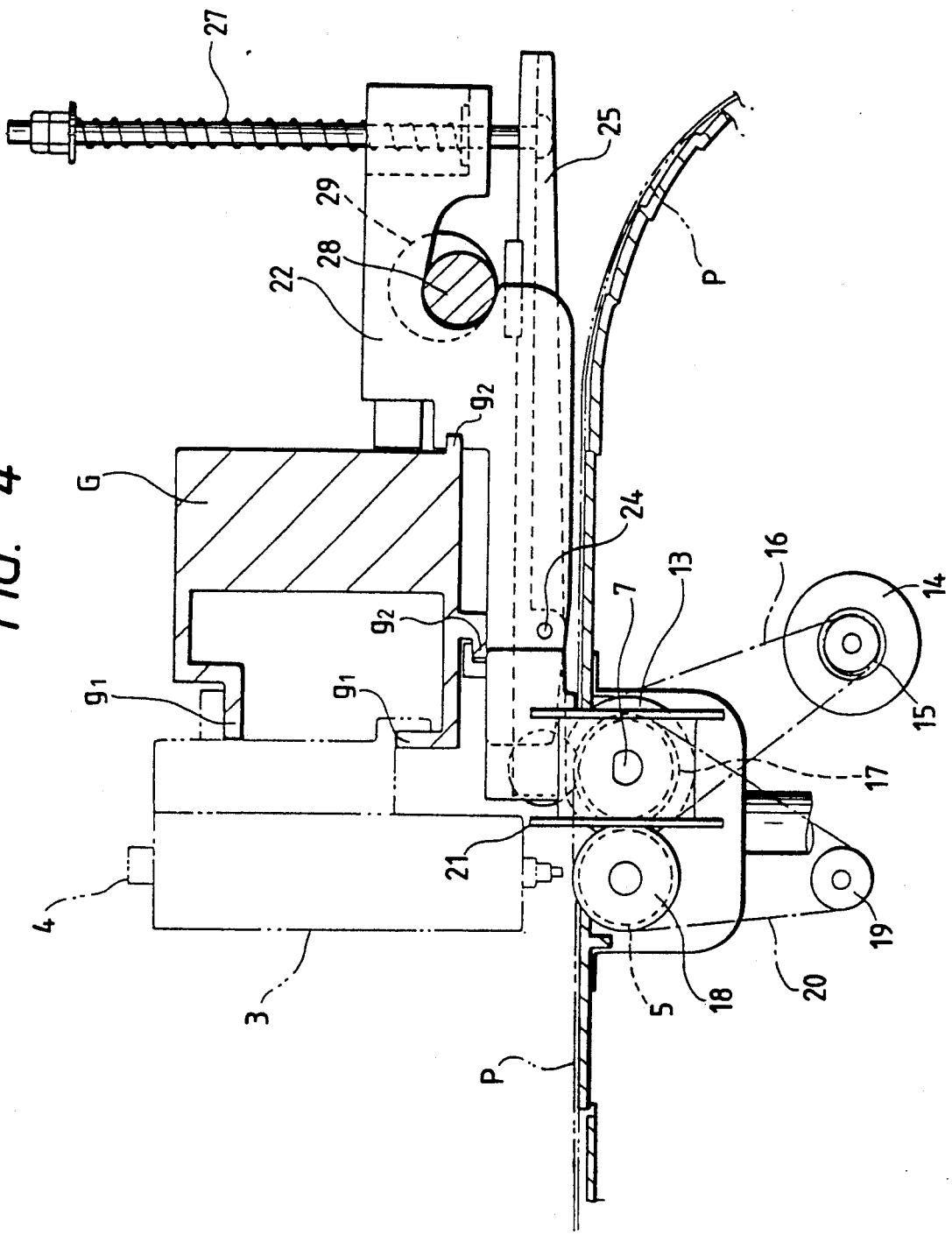
FIG. 4 is a side section taken along the line 4—4 in FIG. 1.
Figure 5:
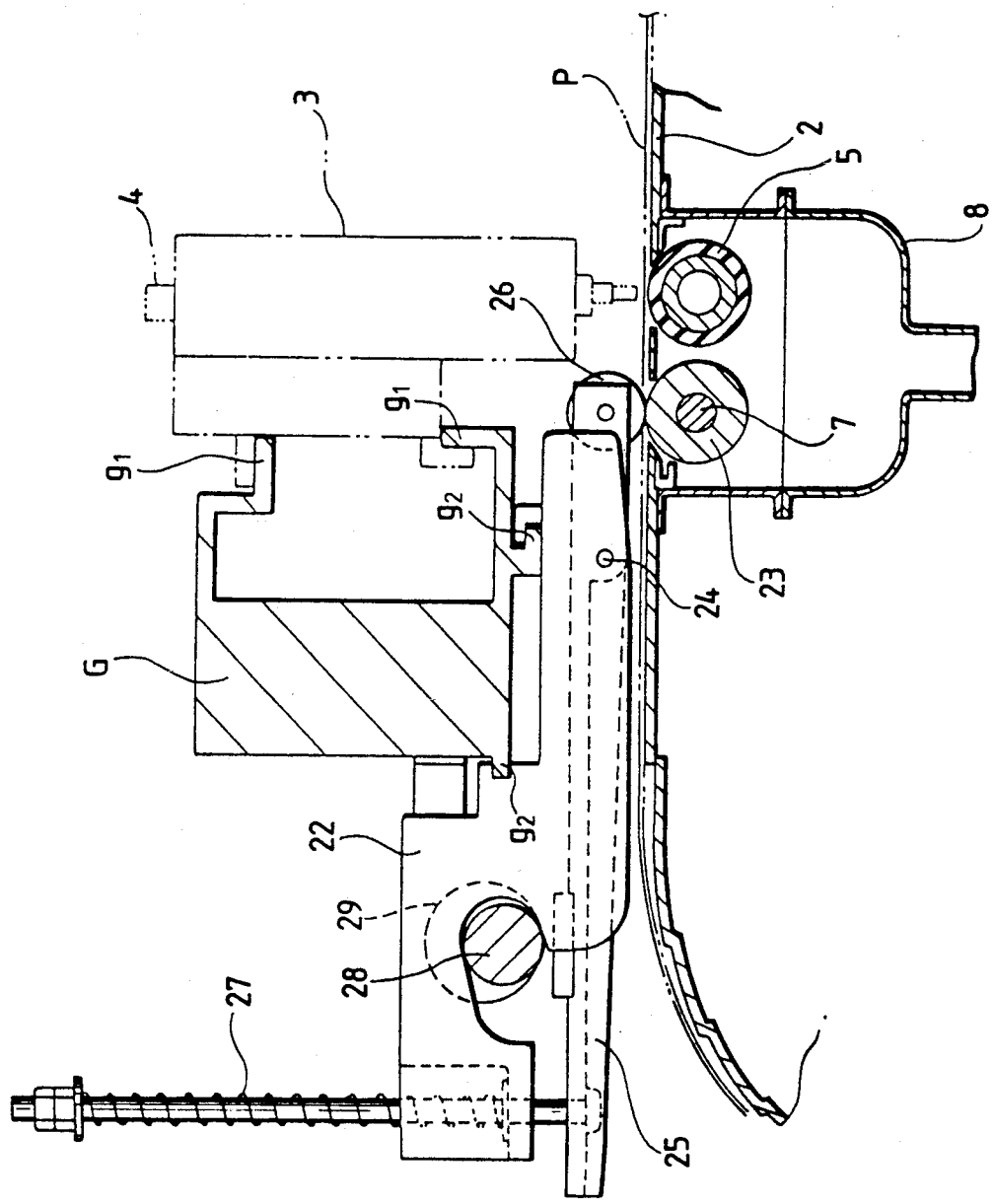
FIG. 5 is a side section taken along the line 5—5 in FIG. 1.

FIG. 3 shows the whole XY plotter according to the present invention in which a sheet of recording paper is set with a one-side criterion system. In the XY plotter, a recording paper stand 2 on which recording paper P can be set is provided on the upper portions of stands 1L and 1R to be attached on a floor. That is, the recording paper P set on the surface of the recording paper stand 2 is fed in the direction indicated by an arrow X by a feeding means which will be described later in detail. A pen carriage 3 movable in the direction perpendicular to the feeding direction of the recording paper P, that is, in the direction indicated by an arrow Y, is provided above the recording paper stand 2, so that recording is performed on the surface of the recording paper P by use of a recording pen 4 (illustrated in FIGS. 4 and 5) supported by the pen carriage 3. The pen carriage 3 is guided in the Y direction by front-portion guiding portions g₁ of a carriage guide G which are shown in FIGS. 4 and 5 and which will be described later, and the position of the recording pen in the Y-direction is deduced by a not-shown carriage feeding mechanism. As shown in FIGS. 1, 2, and 4, recording paper feeding means and a platen roller 5 are provided on the recording paper stand 2 at its upper surface. That is, an attaching groove 6 is formed in the recording paper stand 2 so as to extend in the direction indicated by the arrow Y, and the platen roller 5 and a grip roller shaft 7 provided in parallel to each other are received in the attaching groove 6. The attaching groove 6 is made to communicate with a vacuum box 8 into which a vacuum pressure is exerted.

The recording paper feeding means is provided with the grip roller shaft 7 rotatably supported by a fixed block 9 and bearing stands 10 which are mounted so as to be separated from each other in the attaching groove 6. A fixed-side grip roller 12 with which a fixed-side pinch roller 11 is made to come into rotational contact is fixed to the left end portion, in FIG. 2, of the grip roller shaft 7 having a non-circular section. A follower sprocket 13 is fixed to the grip roller shaft 7 at its right end portion in FIG. 2. A driving-side timing belt 16 hung on a driving sprocket 15 of a pulse motor 14 for feeding the recording paper P is hung on the follower sprocket 13 of the grip roller shaft 7. Further, synchronizing sprockets 17 and 18 are fixed to the grip roller shaft 7 and the platen roller 5 at their end portions respectively, and a synchronizing timing belt 20 tensioned by a tension roller 19 is hung on the synchronizing sprockets 17 and 18. Accordingly, the fixed-side grip roller 12 and the platen roller 5 are rotationally driven in the same direction at respective peripheral speeds synchronized with each other.

Figure 6:
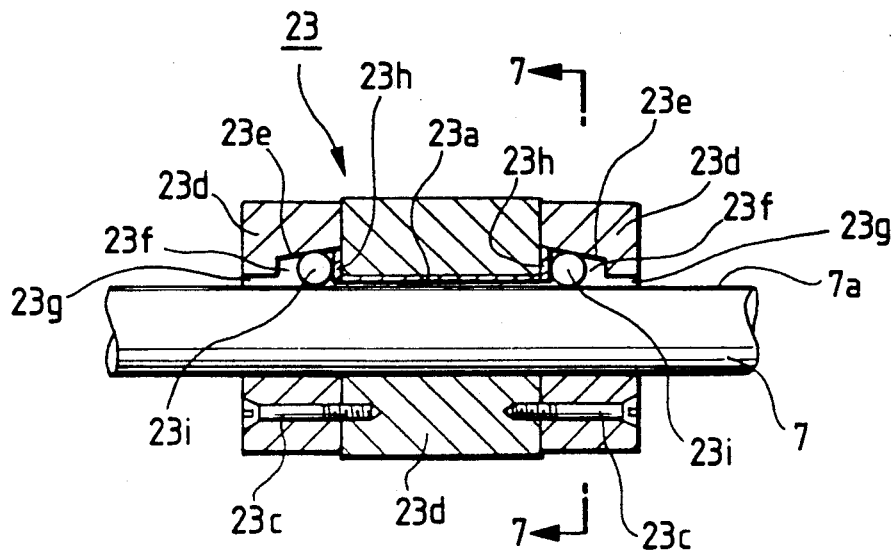
FIG. 6 is an enlarged section of a movable-side grip roller used in the XY plotter.
Figure 7:
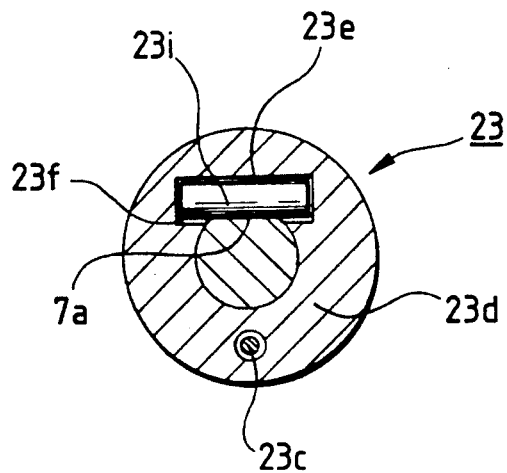
FIG. 7 is a sectional view taken along the line 7—7 in FIG. 6.
Figure 8:
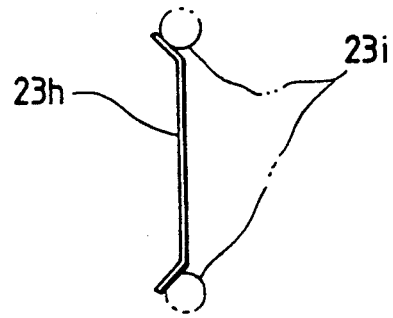
FIG. 8 is a side view showing the free state of a plate spring to be incorporated in the movable-side grip roller.

On the other hand, a movable block 21 movable along the grip roller shaft 7 is provided in the attaching groove 6. As shown in FIGS. 4 and 5, the movable block 21 is fixed to a top end of a movable stand 22 guided by lower guides g₂ of the carriage guide G provided above and parallel to the attaching groove 6. The movable stand 22 may be moved manually or by a not-shown moving means to a predetermined position in the Y-direction corresponding to the size of the recording paper P to be used. A movable-side grip roller 23 shown in detail in FIGS. 6 through 8 is incorporated in the movable stand 22. The movable-side grip roller 23 is constituted by a cylindrical roller body 23b having a central hole 23a through which the grip roller shaft 7 is inserted, and left and right discs 23d fixed by fixing screws 23c to the roller body 23b at left and right end surfaces thereof in FIG. 6, respectively. A wedge-like housing chamber 23f having a slant surface 23e is formed in each of the left and right discs 23d in FIG. 6. That is, the central hole 23a of the roller body 23b has a diameter a little larger than the outer diameter of the grip roller shaft 7, so that the roller body 23b can be freely rotated around the grip roller shaft 7. Further, each of through holes 23g of the left and right discs 23d has a diameter which is also a little larger than the outer diameter of the grip roller shaft 7. However, precision rotational-contact rollers 23i are incorporated in the housing chambers 23f in a manner so that the precision rotational-contact rollers 23i are outwardly urged by respective plate springs 23h interposed between the precision rotational-contact rollers 23i and the respective end surfaces of the roller body 23b. Accordingly, each of the rotational-contact rollers 23i is continuous urged against the slant surface 23e of the corresponding housing chamber 23f and the cut surface 7a of the grip roller shaft 7 by the pressing force of the corresponding plate spring 23h, so that the movable-side grip roller 23 constituted by the roller body 23b, the discs 23d, the rotational-contact rollers 23i, and the plate springs 23h is made to be in a state where the movable-side grip roller 23 has no play in the rotational direction of the grip roller shaft 7 that is in a state in which the movable-side grip roller 23 has neither backlash nor eccentric movement), while it is freely movable in the longitudinal direction of the grip roller shaft 7 (that is, in the Y-direction). Accordingly, if the movable stand 22 on which the movable block 21 is fixed correspondingly to the size of the recording paper P to be used is moved left/right of the recording paper stand 2 (that is in the Y-direction), the movable-side grip roller 23 is moved left/right along the grip roller shaft 7 as the movable block 21 is moved. Of course, since the rotational-contact rollers 23i are in contact with the cut surface 7a of the grip roller shaft 7, the rotational movement of the grip roller shaft 7 is transmitted to the movable-side grip roller 23 with no backlash.

Further, a movable-side pinch roller 26 is provided at a top end of a pinch lever 25 rotatably supported by a fulcrum pin 24 of the movable stand 22 so that the movable-side pinch roller 26 is in contact with the circumferential surface of the movable-side grip roller 23. The movable-side pinch roller 26 is urged against the circumferential surface of the movable-side grip roller 23 by the force of an energizing spring 27 provided between the pinch roller lever 25 and the rear portion of the movable stand 22. A cam shaft 28 for operating the pinch roller lever 25 is provided behind and parallel to the carriage guide G. An eccentric cam 29 fixed to the cam shaft 28 is made so as to oppose a middle portion of the pinch roller lever 25. Accordingly, if the cam shaft 28 is rotated, the pinch roller lever 25 is rotated about the fulcrum pin 24 against the force of the energizing spring 27 to thereby separate the movable-side pinch roller 26 from the movable-side grip roller 23, so that the recording paper P can be grasped between the movable-side grip roller 23 and the movable-side pinch roller 26. Being not illustrated, the pinch roller lever 25 and the eccentric cam 29 are provided also on the fixed-side pinch roller 11, so that if the cam shaft 28 is rotated, also the fixed-side pinch roller 11 is separated from the fixed-side grip roller 12 at the same time as the separation of the movable-side pinch roller 26 from the movable-side grip roller 23.

Returning to FIGS. 1 and 2, a plurality of guide discs 30 are fitted on the grip roller shaft 7 so that the guide discs 30 are movable freely between the fixed block 9 and the movable block 21 along the grip roller shaft 7. An outer diameter of each of the guide discs 30 is selected to be equal to the outer diameter of each of the fixed-side grip roller 12 and the movable-side grip roller 23 so that the discs 30 can surely bear part of the recording paper P between the fixed-side grip roller 12 and the movable-side grip roller 23. A plurality of coil springs 31 in a compressed state are interposed between the guide discs 30, between the fixed block 9 and one guide disc 30, and between the movable block 21 and the other guide disc 30. In the case of the illustrated example, the outer diameter of the coil springs for bearing part of the recording paper P is selected so as to be equal to the outer diameter of each of the fixed-side grip roller 12 and the movable-side grip roller 23. In order to make the recording paper P bearing function more effective, it is preferable that grooves 30a for receiving end portions of corresponding coil springs 31 are formed in the circumferences of the opposite end surfaces of each of the guide discs 30 so that the end portions of the corresponding coil springs 31 are fit in the respective grooves 30a.

Figure 9:
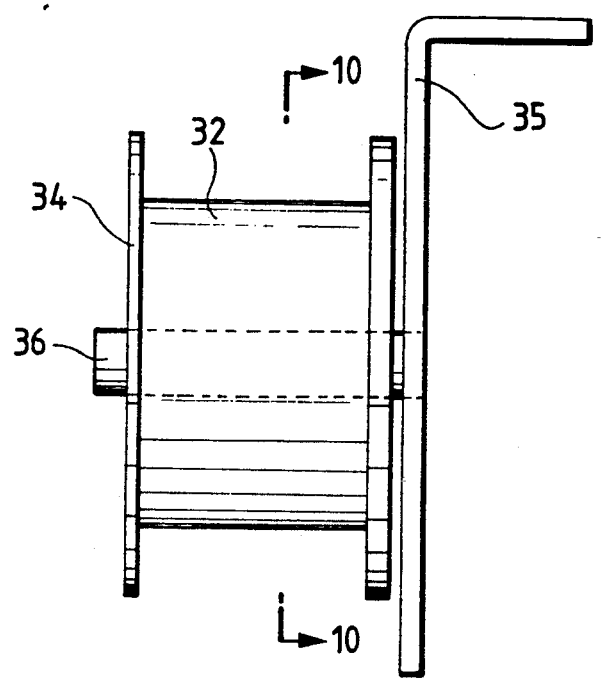
FIG. 9 is a side view of the portion where a take-up reel used in the XY plotter is attached.
Figure 10:
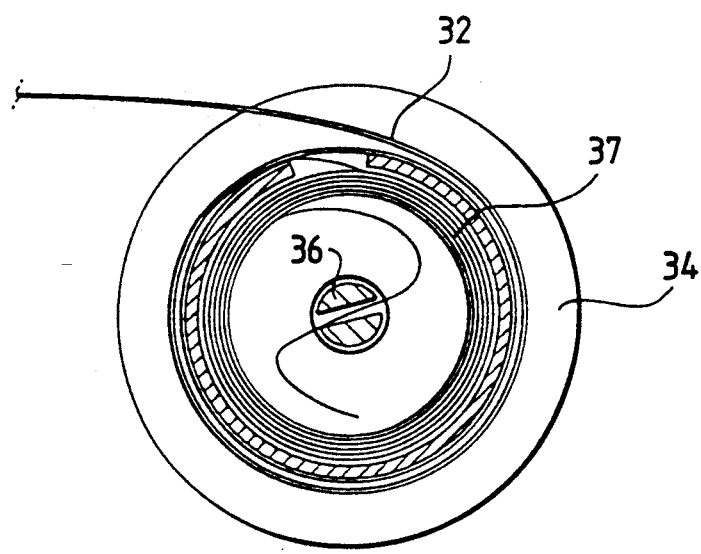
FIG. 10 is a sectional view taken along line 10—10 in FIG. 9.

On the right of the movable-side pinch roller 26, on other hand, a forward end portion 32a of a shielding tape 32 is fixed to the right side of the movable-side pinch roller 26 so that the shielding tape 32 can shield the surface of the opened attaching groove 6 on the right side of the movable block 21 when the movable block 21 is moved left along the grip roller shaft 7 in FIG. 1. As shown in FIG. 1, the shielding tape 32, made of, for example, a metal band, is taken out from a take-up reel 34 through a plurality of guide rollers 33. That is, as shown in FIGS. 9 and 10, the take-up reel 34 is rotatably supported by a reel shaft 36 of a bracket 35, and a spring 37 wound up in the direction to take up the shielding tape 32 is incorporated in the take-up reel 34.

The XY plotter of the illustrated embodiment has such a configuration as described above, so that writing/drawing may be performed in the state where left and right end portions of the recording paper P are grasped between the fixed-side grip roller 12 and the fixed-side pinch roller 11 and between the movable-side grip roller 23 and the movable-side pinch roller 26 respectively. That is, if the cam shaft 28 is rotated after the movable stand 22 is moved left along the attaching groove 6 correspondingly to the recording paper P to be used, the fixed-side pinch roller 11 and the movable-side pinch roller 26 are separated from the fixed-side grip roller 12 and the movable-side grip roller 23 respectively. If the cam shaft 28 is restored after the recording paper P is inserted between the fixed-side pinch roller 11 and the fixed-side grip roller 12 and between the movable-side pinch roller 26 and the movable-side grip roller 23 respectively, the recording paper P can be synchronized with the feeding movement of the pulse motor 14. When the movable stand 22 is moved, the movable-side grip roller 23 can be easily moved along the grip roller shaft 7 because the roller 23i is in rotational contact with the cut surface 7a of the grip roller shaft 7.

When the movable stand 22 is moved, the surface of the attaching groove 6 on the right side of the movable block 21 is shielded by the shielding tape 32 automatically taken out from the take-up reel 34 as the movable block 21 is moved, so that it is possible to prevent causes of faults due to leakage of a vacuum pressure in the vacuum box 8, the falling of foreign matter into the attaching groove 6, etc. Further, even if the movable block 21 is moved leftward in the drawing, the guide discs 30 are automatically equidistantly disposed between the fixed block 9 and the movable block 21, because the coil springs 31 provided between the guide discs 30 have the same spring constant. Further, since the vacuum pressure from the vacuum box 8 is applied to the opening portion of the attaching groove 5 through a gap of the XY plotter, the recording paper P is surely borne by the guide discs 30 and the circumferential surfaces of the coil springs 31, so that the recording paper P is fed to the platen 5 without being folded or bent.

Accordingly, writing/drawing can be performed by applying a recording signal to the recording pen 4 under the control of the synchronizing signal applied to the pulse motor 14 and the pen carriage 3. In the recording operation, the right end portion of the recording paper P completely follows the feeding operation of the grip roller shaft 7 caused by the pulse motor 14. That is, as described above, the respective rotational-contact rollers 23i are urged by the force of the corresponding plate springs 23h against the cut surface 7a of the grip roller shaft 7 and the respective slant surfaces 23e of the corresponding housing chambers 23f, so that there is no backlash between the grip roller shaft 7 and the movable-side grip roller 23, and the quality in recording images can be improved.

Although description has been made above, by way of example, about a case where a pair of the movable-side grip roller 23 and the movable-side pinch roller 26 are used in the illustrated embodiment, it is apparent that two pairs of movable-side grip rollers 23 and movable-side pinch rollers 26 may be used when recording paper P is to be set with a center criterion system.

As is apparent from the above description, according to the present invention, a partial grip roller which is movable along a grip roller shaft is attached to the grip roller shaft, and a pinch roller the position of which is adjusted together with the partial grip roller, is made to be in contact with the circumferential surface of the grip roller. Accordingly, there arise advantages in that it is possible to realize making the recording paper feeding speed high because of the extremely small inertia efficiency of the recording paper feeding portion, and the size of the recording paper to be used is not limited because the position of the partial grip roller and pinch roller can be adjusted desiredly.

What is claimed is:

1. An XY plotter comprising:
   at least one pair of grip and pinch rollers for feeding recording paper in one direction while gripping the recording paper therebetween;
   a pen carriage movable in a direction perpendicular to said one direction;
   a pen supported by said pen carriage for performing recording on said recording paper;
   a grip roller shaft provided parallel to a traveling direction of said pen carriage, said grip roller shaft having a non-circular section;
   movable stand arranged so that a position thereof is adjustable in a longitudinal direction of said grip roller shaft; and
   said at least one pair of grip and pinch rollers including a movable partial grip roller and a pinch roller, said movable partial grip roller being mounted on said movable stand so that said movable partial grip roller is not rotatable relative to said grip roller shaft but is movable on said grip roller shaft in the longitudinal direction thereof, said pinch roller being supported on said movable stand so that said pinch roller is made to come into contact against a circumferential surface of said movable partial grip roller.

2. An XY plotter as claimed in claim 1, wherein said at least one pair of grip and pinch rollers comprise two pairs of grip and pinch rollers when said recording paper is to be set with a center criterion system.

* * * * *

UNITED STATES PATENT AND TRADEMARK OFFICE
CERTIFICATE OF CORRECTION

PATENT NO. : 5,289,206
DATED : February 22, 1994
INVENTOR(S) : Tadao ISHIKAWA, et al.

It is certified that error appears in the above-indentified patent and that said Letters Patent is hereby corrected as shown below:

On the title page, Item [75], the 2nd inventor's first name should read as follows:

--Kazuhiko--

Signed and Sealed this

Fourteenth Day of June, 1994

Attest:

BRUCE LEHMAN

*Attesting Officer*     *Commissioner of Patents and Trademarks*